(Model.)

S. F. STEVENS.
RAILWAY PASSENGER TARIFF AND DISTANCE GUIDE BOOK.

No. 310,329. Patented Jan. 6, 1885.

Witnesses
Stanley M. Holden
Charles S. Brintnall

Inventor
Samuel Frederick Stevens
by William E. Hagan
His Attorney

UNITED STATES PATENT OFFICE.

SAMUEL FREDERICK STEVENS, OF NORTH ADAMS, MASSACHUSETTS.

RAILWAY PASSENGER-TARIFF AND DISTANCE GUIDE-BOOK.

SPECIFICATION forming part of Letters Patent No. 310,329, dated January 6, 1885.

Application filed November 13, 1883. (Model.)

*To all whom it may concern:*

Be it known that I, SAMUEL FREDERICK STEVENS, of North Adams, county of Berkshire, and State of Massachusetts, have invented a new and useful Improvement in Railway-Guides, of which the following is a specification.

My invention relates to a railway guide-book for the use of the conductors of railway-trains, the object and purpose of my invention being, by means of the form given to the leaves of a book and the relative arrangement of the subject-matter it contains, to enable the conductor of a train to determine promptly and with ease the local distances and passenger-fares between stations, with the book of such a form that it may be carried in the pocket and designed to take the place of the large folded sheets now used for the same purpose.

The better results or conveniences had by the use of my invention are accomplished by the form given to the pages of the book, in combination with the arrangement of the printed matter thereon, and as the same is shown in the accompanying drawings, forming a part of this specification, of which—

Figure 1:
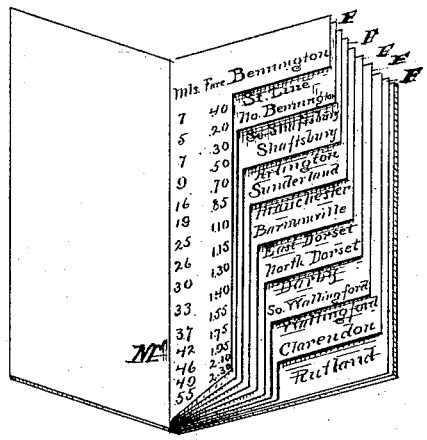
Figure 2:
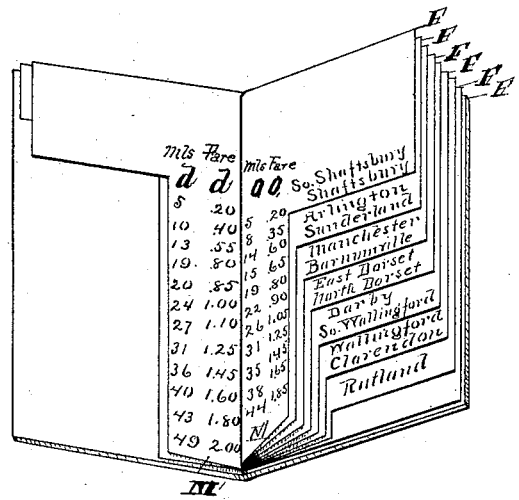

Figure 1 shows the book as open at the first page, and Fig. 2 illustrates it as open at the fifth page, both illustrations being perspectives of the book where indicated as open.

Each of the pages of the book is cut with an index-fly, F, enlarging in depth from the top to the bottom of each inwardly-succeeding page. The names of two of the road-stations in their order as they occur on the road are printed on the lower underlapping edge of each fly, excepting that of the first page, and upon the margin M on the inner edge of the sheet and oppositely to the name of the stations is printed the distance of each station from that one which is at the top of the list on the fly of the first page, and on a column alongside of the distance-column there is printed the passenger-fare corresponding to that station from the first station. Thus, as shown at Fig. 1, the distance from Bennington, the first station, to Manchester, will be found to be twenty-five miles, and the passenger-fare from Bennington to Manchester is $1.10, these being the figures opposite the station "Manchester" in the columns indicating fare and distance. Thus, all the several distances and fares between Bennington, the first station, and the names of the stations printed on the fly-index of each page, are determined by the figures printed oppositely on the inner edge of the first page, when the book is opened thereat, one column indicating distances and the other fares.

To so print and arrange the subject-matter of the book that it will also indicate the fares and distances between stations other than the first station, there is printed on every page but the first page, on the reverse side of the margin M, and on what forms the inner edge, M', of each left-hand page, where the book is opened, two columns of figures, d d, one of them denoting distances and the other fares.

The figures of the columns d d opposite the station-names on the fly-leaves give the distance and fares between the upper one of the two stations printed on the fly-leaf where the book is opened and the stations below. Thus, as indicated at Fig. 2, where the book is open, the distance between South Shaftsbury and Sunderland is thirteen miles, and the fare between these points is fifty-five cents, "South Shaftsbury" being the upper station-name on the fly where the book is opened and the figures, given quantitively, coming opposite the station "Sunderland" upon one of the fly-indices below. The top figures of the columns d d indicate the distance and fare between the two stations, the names of which are printed on each fly. Thus, the distance between Shaftsbury and South Shaftsbury is read as "5 miles," and the fare between these stations as "20 cts.," it being determined by the figures at the tops of the columns d d.

To so print and arrange the subject-matter of the book that the distances and fares between the lower one of two stations printed on the fly-index of each page may be determined, there is printed on the part corresponding to the margin M of page 1 the two columns of figures O O, the latter figures having, however, a different relative and quantitive value from those upon page 1 occupying the same position and having a different application, one of the columns O referring to distances and the other to fares. Thus, as indicated at Fig. 2, the distance between Shaftsbury and Manchester is "15 miles," and the fare is read as "65 cts.," "Shaftsbury" being the lower name on the fly-index at Fig. 2, where the book is opened, and the figures given for fare and distance being those which come opposite to the name of the station "Manchester" in the columns O O on the inner marginal edge, M, of the right-hand page of the book where open. Each page, excepting the first, is made with the names of two stations printed thereon in the order in which they occur on the road, and the fly-index of each page, excepting the first, underlaps the preceding page, so that there is thus shown the names of all the stations, and when the book is opened at any page but the first the fares and distances are read as relating to the top one of the two station-names of each fly, and the succeeding stations from the columns on the inner edge, M', of the left-hand page where opposite the stations on the succeeding fly-indices, and the fares and distances as between the lower one of the two station-names of each fly where the book is opened, excepting at the first page, is read from the columns upon the inner edge, M, of the right-hand page where opposite the station-names upon the succeeding fly-indices.

While I have shown my invention for the purposes of illustration applied to the stations upon the T. & B. railway, it may be applied to those of any road by changing the names and figures, and by increasing or decreasing the numbers of pages as may be required.

As thus made and arranged, a railway-guide is produced which takes up little room, one which is easily carried in the pocket, and is much more convenient for use than the large sheets now employed for this purpose.

Having thus described my invention, what I claim, and desire to secure by Letters Patent, is—

A railway guide-book with index-leaves having thereon the names of two stations in their order and columns of figures opposite the names of the stations, separately indicating on each left-hand page the fare and distances between the upper station of the fly-leaf where the book is opened and each succeeding station below, and columns of figures on the inner edge of the right-hand pages opposite the station-names, indicating the fare and distance between the second station on the fly-leaf where the book is opened and the stations below, as shown and described.

Signed at Troy, New York, this 8th day of November, 1883, and in the presence of the two witnesses whose names were by them below written.

SAMUEL FREDERICK STEVENS.

Witnesses:
GEO. M. PAYFER,
E. P. LAWTON.